US012146121B2

(12) United States Patent
Belowich et al.

(10) Patent No.: US 12,146,121 B2
(45) **Date of Patent: *Nov. 19, 2024**

(54) FABRIC CARE COMPOSITION

(71) Applicants: Dow Global Technologies LLC, Midland, MI (US); Rohm and Haas Company, Collegeville, PA (US)

(72) Inventors: Matthew E. Belowich, Midland, MI (US); David S. Laitar, Midland, MI (US); Randara Pulukkody, Landsdale, PA (US); Eric Wasserman, Collegeville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 240 days.

This patent is subject to a terminal disclaimer.

(21) Appl. No.: 17/632,678

(22) PCT Filed: Sep. 23, 2020

(86) PCT No.: PCT/US2020/052215
§ 371 (c)(1),
(2) Date: Feb. 3, 2022

(87) PCT Pub. No.: WO2021/061771
PCT Pub. Date: Apr. 1, 2021

(65) Prior Publication Data

US 2022/0290077 A1 Sep. 15, 2022

Related U.S. Application Data

(60) Provisional application No. 62/905,502, filed on Sep. 25, 2019.

(51) Int. Cl.
*C11D 3/37* (2006.01)
*C11D 1/831* (2006.01)
(Continued)

(52) U.S. Cl.
CPC ............ *C11D 3/3707* (2013.01); *C11D 1/831* (2013.01); *C11D 3/0015* (2013.01); *C11D 3/373* (2013.01);
(Continued)

(58) Field of Classification Search
CPC . C11D 3/3707; C11D 3/0015; C11D 11/0017; C11D 1/831
See application file for complete search history.

(56) References Cited

U.S. PATENT DOCUMENTS 3,158,581 A 11/1964 Vandenberg et al.
4,144,122 A 3/1979 Emanuelsson et al.
(Continued)

FOREIGN PATENT DOCUMENTS

CA 2285538 A1 * 10/1998
FR 2439264 A1 5/1980
(Continued)

OTHER PUBLICATIONS

DOW UCARE Polymer (Year: 2018).*
(Continued)

*Primary Examiner* — Liam J Heincer
*Assistant Examiner* — M. Reza Asdjodi
(74) *Attorney, Agent, or Firm* — Thomas S. Deibert

(57) ABSTRACT

A fabric care composition is provided, comprising: a fabric care benefit agent; and a deposition aid polymer is provided, comprising >50 to 99 wt % of structural units of formula (I)

(I)

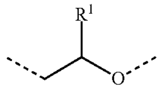

wherein $R^1$ is selected from hydrogen, $-C_{1-4}$ alkyl and $-CH_2OR^3$; wherein $R^3$ is selected from $-C_{1-12}$ alkyl and phenyl; and 1 to <50 wt % of structural units of formula (II)

(II)

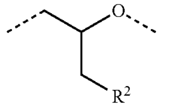

wherein $R^2$ is selected from Formula (III), Formula (IV) and Formula (V)

(III)

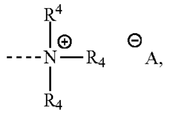

(IV)

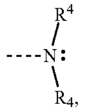

and (V)

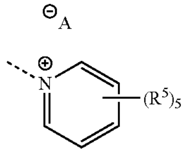

wherein $A^-$ is a counter anion; wherein $R^4$ is selected from a hydrogen, a $-C_{1-12}$ alkyl group and a phenyl group; and wherein $R^5$ is selected from a hydrogen and a $-C_{1-8}$ alkyl
(Continued)

group; wherein the deposition aid polymer has a weight average molecular weight of <100,000 Daltons; and with the proviso that the deposition aid polymer has an average of ≥two structural units of formula (II) per molecule.

20 Claims, No Drawings

(51) Int. Cl.

| | |
|---|---|
| ***C11D 3/00*** | (2006.01) |
| ***C11D 11/00*** | (2006.01) |
| *C11D 1/16* | (2006.01) |
| *C11D 1/22* | (2006.01) |
| *C11D 1/72* | (2006.01) |

(52) U.S. Cl.

CPC .................. *C11D 1/16* (2013.01); *C11D 1/22* (2013.01); *C11D 1/72* (2013.01); *C11D 2111/12* (2024.01)

(56) References Cited

U.S. PATENT DOCUMENTS

| | | | | |
|---|---|---|---|---|
| 4,627,927 | A | 12/1986 | Sakatami et al. | |
| 5,696,071 | A * | 12/1997 | Okutsu | A61K 8/416 510/357 |
| 5,853,611 | A * | 12/1998 | Kawamukai | A61Q 19/00 528/271 |
| 6,946,037 | B2 | 9/2005 | Serve et al. | |
| 7,056,879 | B2 * | 6/2006 | Wang | C11D 3/3757 510/276 |
| 7,056,880 | B2 * | 6/2006 | Wang | C11D 3/3757 510/276 |
| 7,318,843 | B2 * | 1/2008 | Sivik | C11D 3/43 510/276 |
| 7,335,630 | B2 | 2/2008 | Delplancke et al. | |
| 7,528,099 | B2 | 5/2009 | Wahl et al. | |
| 7,608,575 | B2 | 10/2009 | Panandiker et al. | |
| 10,351,833 | B2 | 7/2019 | Malten et al. | |
| 2003/0166495 | A1 * | 9/2003 | Wang | C11D 3/3749 510/475 |
| 2004/0121929 | A1 * | 6/2004 | Wang | C11D 3/3757 510/276 |
| 2004/0121930 | A1 * | 6/2004 | Wang | C11D 3/3757 510/276 |
| 2005/0175568 | A1 | 8/2005 | Asari et al. | |
| 2010/0325812 | A1 * | 12/2010 | Panandiker | C11D 3/3723 510/516 |
| 2016/0090551 | A1 * | 3/2016 | Fossum | C11D 1/22 510/327 |
| 2016/0090552 | A1 | 3/2016 | Loughnane et al. | |
| 2016/0348040 | A1 * | 12/2016 | Bianchetti | C11D 3/323 |
| 2022/0290076 | A1 * | 9/2022 | Belowich | C11D 3/3707 |
| 2022/0290077 | A1 * | 9/2022 | Belowich | C11D 1/831 |
| 2023/0095096 | A1 * | 3/2023 | Leibig | C08G 18/4887 525/410 |
| 2023/0174899 | A1 * | 6/2023 | Backer | C11D 3/3757 510/299 |

FOREIGN PATENT DOCUMENTS

| | | | | |
|---|---|---|---|---|
| GB | 1275184 | A | 5/1972 | |
| GB | 2360792 | A | 10/2001 | |
| WO | 2001025386 | A1 | 4/2001 | |
| WO | WO-2004022686 | A1 * | 3/2004 | A61P 3/06 |
| WO | 2009065738 | | 5/2009 | |
| WO | 2010105922 | | 9/2010 | |
| WO | WO-2016049388 | A1 * | 3/2016 | C11D 1/16 |
| WO | 2017102874 | | 6/2017 | |

OTHER PUBLICATIONS

Jana Herzberger et al. Macromolecules 2014, 47, 7679-7690 (Year: 2014).*

Gruber, "The Use of X-Ray Fluorescent Spectroscopy to Study the Influence of Cationic Polymers on Silicone Oil Deposition from Shampoo", Journal of Cosmetic Science, 2001, 52, pp. 131-136.

Jeffamine D-400 Polyetheramine, Huntsman, 2007.

Kalihari et al., Rev. Sci. Instrum. 2013, 84, 035104.

Lundberg, "Poly ethylene oxide-co-methylene ethylene oxide: A Hydrolytically Degradable Poly ethylene oxide Platform", ACS Macro Lett., 2012, 1(11), pp. 1240-1243.

Majewics, "Linking Enhanced Deposition Agent Functionality with Aesthetic Performance", Journal of Cosmetic Science, 2001, 62, pp. 101-108.

Search Report from corresponding Chinese Application No. 202080062664.4 dated Apr. 25, 2023.

* cited by examiner

FABRIC CARE COMPOSITION

The present invention relates to a fabric care composition. In particular, the present invention relates to a fabric care composition including a fabric care benefit agent and a deposition aid polymer for laundry, comprising >50 to 99 wt %, based on weight of the deposition aid polymer, of structural units of formula (I)

(I)

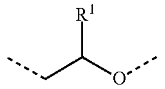

wherein $R^1$ is selected from hydrogen, $—C_{1-4}$ alkyl and $—CH_2OR^3$; wherein $R^3$ is selected from $—C_{1-12}$ alkyl and phenyl; and 1 to <50 wt %, based on weight of the deposition aid polymer, of structural units of formula (II)

(II)

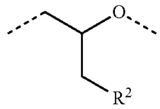

wherein $R^2$ is selected from a moiety of Formula (III), a moiety of Formula (IV) and a moiety of Formula (V)

(III)

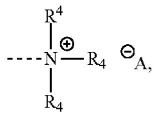

(IV)

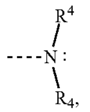

and (V)

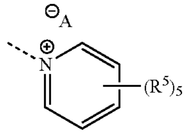

wherein $A^-$ is a counter anion balancing the cationic charge on the N; wherein $R^4$ is selected from hydrogen, $—C_{1-12}$ alkyl and phenyl; and wherein $R^5$ is selected from hydrogen and $—C_{1-8}$ alkyl; wherein the deposition aid polymer has a weight average molecular weight of <100,000 Daltons; and with the proviso that the deposition aid polymer has an average of at least two structural units of formula (II) per molecule. The invention also relates to method of treating laundry.

Cleaning of fabrics via laundering is useful for removing stains, odors and soils. Notwithstanding, the laundering process tends to induce mechanical and chemical damage to the textiles which results in wrinkles, color fading, pills, fuzz, dye transfer, stiffness, fabric wear, fiber deterioration and other issues consumer's find undesirable. Accordingly, laundry products (e.g., detergents, fabric softeners) are frequently formulated to include fabric care benefit agents to reduce some of the undesirable laundering issues.

Many fabric care benefit agents have been found to provide only limited benefits due to inadequate delivery efficiency to fabrics during the laundering process. The affinity between the fabric care benefit agents and the fabrics is typically impaired by a lack of natural attractive forces between the fabric care benefit agents and the fabrics. This derives from most fabric care benefit agents being anionic or nonionic to avoid undesirable interaction with anionic surfactants typically contained in the laundry product formulations which may lead to cleaning negatives. Given that most fibers used in fabric (e.g., cotton, wool, silk and nylon) carry a slightly anionic charge in the laundry solution, there exist repulsive forces between the fabric care benefit agents and the fabric leading to the noted poor delivery efficiency.

One approach for enhancing the delivery of a fabric care benefit agent is described by Wang et al in U.S. Pat. No. 7,056,879. Wang et al disclose a laundry product composition comprising a stable mixture of: a) from about 0.1% to about 10%, by weight of the composition, of at least one water insoluble silicone derivative fabric care benefit agent, wherein the silicone derivative fabric care benefit agent has a particle size of from about 1 nm to 100 microns; b) from about 0.01% to about 5%, by weight of the composition, of at least one cationic cellulose delivery enhancing agent; c) from about 1% to about 80%, by weight of the composition, of a surfactant; d) from about 3.96% to about 80%, by weight of the composition, of a builder; and e) from about 0.001% to about 5%, by weight of the composition, of a compatible enzyme selected from lipase enzymes, protease enzymes or mixtures thereof; wherein the ratio of the delivery enhancing agent to the fabric care benefit agent is from about 1:50 to about 1:1.

Notwithstanding, there remains a continuing need for fabric care compositions containing fabric care benefit agents and a deposition aid for improving the delivery efficiency of the fabric care benefit agent.

The present invention provides a fabric care composition comprising: a fabric care benefit agent; and a deposition aid polymer, comprising: (a) >50 to 99 wt %, based on weight of the deposition aid polymer, of structural units of formula (I)

(I)

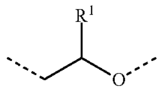

wherein each $R^1$ is independently selected from the group consisting of a hydrogen, a $—C_{1-4}$ alkyl group and a $—CH_2OR^3$ group; wherein each $R^3$ is independently selected from the group consisting of a $—C_{1-12}$ alkyl group and a phenyl group; and (b) 1 to <50 wt %, based on weight of the deposition aid polymer, of structural units of formula (II)

(II)

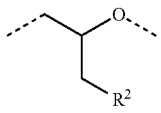

wherein each $R^2$ is independently selected from the group consisting of a moiety of Formula (III), a moiety of Formula (IV) and a moiety of Formula (V)

(III)

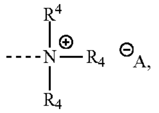

(IV)

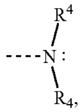

and (V)

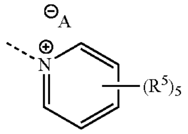

wherein $A^-$ is a counter anion balancing the cationic charge on the N; wherein each $R^4$ is independently selected from the group consisting of a hydrogen, a $—C_{1-12}$ alkyl group and a phenyl group; and wherein each $R^5$ is independently selected from the group consisting of a hydrogen and a $—C_{1-8}$ alkyl group; wherein the deposition aid polymer has a weight average molecular weight of <100,000 Daltons; and with the proviso that the deposition aid polymer has an average of at least two structural units of formula (II) per molecule.

The present invention provides a method of treating an article of laundry, comprising: providing an article of laundry; providing a fabric care composition of the present invention; providing a bath water; and applying the bath water and the fabric care composition to the article of laundry to provide a treated article of laundry; wherein the fabric care benefit agent is associated with the treated article of laundry.

The present invention provides a method of improving the laundry delivery efficacy of a fabric care benefit agent utilizing the fabric care composition of the present invention.

DETAILED DESCRIPTION

It has been surprisingly found that fabric care compositions comprising a fabric care benefit agent and the deposition aid polymers as described herein having a weight average molecular weight of <100,000 Daltons are effective at significantly increasing the deposition efficiency of fabric care benefit agent (e.g., hydrophobic poly(dimethylsiloxane) fabric conditioning agents).

Unless otherwise indicated, ratios, percentages, parts, and the like are by weight. Weight percentages (or wt %) in the composition are percentages of dry weight, i.e., excluding any water that may be present in the composition.

As used herein, unless otherwise indicated, the terms "weight average molecular weight" and "$M_w$" are used interchangeably to refer to the weight average molecular weight as measured in a conventional manner with gel permeation chromatography (GPC) and conventional standards, such as polystyrene standards. GPC techniques are discussed in detail in Modern Size Exclusion Liquid Chromatography: Practice of Gel Permeation and Gel Filtration Chromatography, Second Edition, Striegel, et al., John Wiley & Sons, 2009. Weight average molecular weights are reported herein in units of Daltons.

The term "structural units" as used herein and in the appended claims refers to the remnant of a given raw material; thus a structural unit of ethyleneoxide is illustrated:

(I)

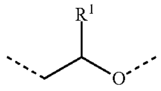

wherein the dotted lines represent the points of attachment to the polymer backbone and where $R^1$ is a hydrogen.

Preferably, the fabric care composition of the present invention, comprises: a fabric care benefit agent (preferably, 0.1 to 10 wt % (more preferably, 0.5 to 8 wt %; still more preferably, 1 to 7.5 wt %; most preferably, 2.5 to 6 wt %), based on weight of the fabric care composition, of the fabric care benefit agent); a deposition aid polymer (preferably, 0.1 to 15 wt % (more preferably, 0.5 to 10 wt %; still more preferably, 0.75 to 7.5 wt %; yet more preferably, 1 to 5 wt %; most preferably, 2 to 3 wt %), based on weight of the fabric care composition, of the deposition aid polymer), comprising: (a) >50 to 99 wt %, based on weight of the deposition aid polymer, of structural units of formula (I)

(I)

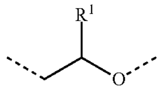

wherein each $R^1$ is independently selected from the group consisting of a hydrogen, a $—C_{1-4}$ alkyl group and a $—CH_2OR^3$ group; wherein each $R^3$ is independently selected from the group consisting of a $—C_{1-12}$ alkyl group and a phenyl group; and (b) 1 to <50 wt %, based on weight of the deposition aid polymer, of structural units of formula (II)

(II)

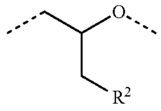

wherein each $R^2$ is independently selected from the group consisting of a moiety of Formula (III), a moiety of Formula (IV) and a moiety of Formula (V)

(III)

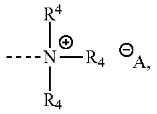

(IV)

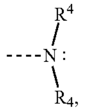

and (V)

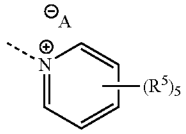

wherein $A^-$ is a counter anion balancing the cationic charge on the N; wherein each $R^4$ is independently selected from the group consisting of a hydrogen, a $—C_{1-12}$ alkyl group and a phenyl group; and wherein each $R^5$ is independently selected from the group consisting of a hydrogen and a $—C_{1-8}$ alkyl group; wherein the deposition aid polymer has a weight average molecular weight of <100,000 Daltons; and with the proviso that the deposition aid polymer has an average of at least two structural units of formula (II) per molecule; optionally, a liquid carrier (preferably, 0 to 99.8 wt % (more preferably, 25 to 93 wt %; still more preferably, 40 to 88.25 wt %; yet more preferably, 50 to 89.9 wt %; most preferably, 60 to 82.5 wt %), based on weight of the fabric care composition, of the liquid carrier); optionally, a cleaning surfactant (preferably, 0 to 60 wt % (more preferably, 5 to 40 wt %; still more preferably, 7.5 to 30 wt %; most preferably, 10 to 25 wt %), based on weight of the fabric care composition, of the cleaning surfactant); and optionally, a builder (preferably, 0 to 60 wt % (more preferably, 1 to 50 wt %; still more preferably, 2.5 to 25 wt %; most preferably, 3 to 7 wt %), based on weight of the fabric care composition, of the builder).

Preferably, the fabric care composition of the present invention, comprises: a fabric care benefit agent. More preferably, the fabric care composition of the present invention, comprises: 0.1 to 10 wt % (more preferably, 0.5 to 8 wt %; still more preferably, 1 to 7.5 wt %; most preferably, 2.5 to 6 wt %), based on weight of the fabric care composition, of a fabric care benefit agent. Most preferably, the fabric care composition of the present invention, comprises: 0.1 to 10 wt % (more preferably, 0.5 to 8 wt %; still more preferably, 1 to 7.5 wt %; most preferably, 2.5 to 6 wt %), based on weight of the fabric care composition, of a fabric care benefit agent; wherein the fabric care benefit agent is selected from the group consisting of a softening agent, a fragrance and mixtures thereof.

Preferably, the fabric care composition of the present invention, comprises: 0.1 to 10 wt % (more preferably, 0.5 to 8 wt %; still more preferably, 1 to 7.5 wt %; most preferably, 2.5 to 6 wt %), based on weight of the fabric care composition, of a fabric care benefit agent; wherein the fabric care benefit agent includes a fabric softening silicone; wherein the fabric softening silicone is selected from the group consisting of a nitrogen free silicone polymer, an anionic silicone polymer and mixtures thereof. More preferably, the fabric care composition of the present invention, comprises: 0.1 to 10 wt % (more preferably, 0.5 to 8 wt %; still more preferably, 1 to 7.5 wt %; most preferably, 2.5 to 6 wt %), based on the weight of the fabric care composition, of a fabric care benefit agent; wherein the fabric care benefit agent is a fabric softening silicone. Most preferably, the fabric care composition of the present invention, comprises: 0.1 to 10 wt % (more preferably, 0.5 to 8 wt %; still more preferably, 1 to 7.5 wt %; most preferably, 2.5 to 6 wt %), based on the weight of the fabric care composition, of a fabric care benefit agent; wherein the fabric care benefit agent is a fabric softening silicone selected from the group consisting of a nitrogen free silicone polymer, an anionic silicone polymer and mixtures thereof (preferably, wherein the fabric softening silicone is in the form of an emulsion (preferably, a nonionic emulsion; more preferably, a nonionic emulsion prepared from nonionic emulsifiers; most preferably, a nonionic emulsion prepared from branched nonionic emulsifiers (e.g., Ecosurf™ EH-3 available from The Dow Chemical Company))).

Preferred nitrogen free silicone polymers include nonionic nitrogen free silicone polymers, zwitterionic nitrogen free silicone polymers, amphoteric nitrogen free silicone polymers and mixtures thereof. Preferred nitrogen free silicone polymers have formula (III), (IV) or (V)(preferably, formula (III) or (V)):

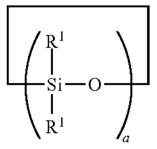

(III)

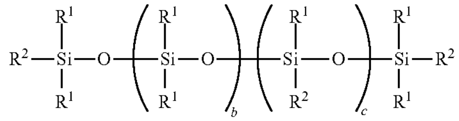

(IV)

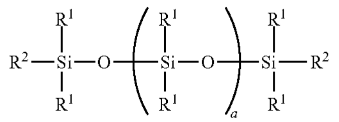

(V)

wherein each $R^1$ is independently selected from the group consisting of a $C_{1-20}$ alkyl group, a $C_{2-20}$ alkenyl group, a $C_{6-20}$ aryl group, a $C_{7-20}$ arylalkyl group, a $C_{7-20}$ alkylaryl group, a $C_{7-20}$ arylalkenyl group and a $C_{7-20}$ alkenylaryl group (preferably, wherein $R^1$ is selected from the group consisting of a methyl group, a phenyl group and a phenylalkyl group); wherein each $R^2$ is independently selected from the group consisting of a $C_{1-20}$ alkyl group, a $C_{2-20}$ alkenyl group, a $C_{6-20}$ aryl group, a $C_{7-20}$ arylalkyl group, a $C_{7-20}$ alkylaryl group, a $C_{7-20}$ arylalkenyl group, a $C_{7-20}$ alkenylaryl group and a poly(ethyleneoxide/propyleneoxide) copolymer group having formula (VI)

$$—(CH_2)_nO(C_2H_4O)_m(C_3H_6O)_pR^3 \quad (VI)$$

wherein each $R^3$ is independently selected from the group consisting of a hydrogen, a $C_{1-4}$ alkyl group and an acetyl group; wherein at least one $R^2$ is a poly(ethyleneoxy/propyleneoxy) copolymer group having formula (VI); wherein a has a value such that the viscosity of the nitrogen free silicone polymer according to formula (III) or formula (V) is 2 to 50,000,000 centistokes at 20° C. (preferably, 10,000 to 800,000 centistokes at 20° C.); wherein b is 1 to 50 (preferably, 1 to 30); wherein c is 1 to 50 (preferably, 1 to 30); wherein n is 1 to 50 (preferably, 3 to 5); wherein m is 1 to 100 (preferably, 6 to 100); wherein p is 0 to 14 (preferably, 0 to 3); wherein m+p is 5 to 150 (preferably, 7 to 100)(preferably, wherein $R^2$ is selected from the group consisting of a methyl group, a phenyl group, a phenylalkyl group and from the group having formula (VI)). Most preferred nitrogen free silicone polymers have formula (V), wherein $R^1$ is a methyl and wherein a has a value such that the viscosity of the nitrogen free silicone polymer is 60,000 to 700,000 centistokes at 20° C.

Preferred nitrogen free silicone polymers include anionic silicone polymers. Anionic silicone polymers are described, for example, in The Encyclopedia of Polymer Science, volume 11, p. 765. Examples of anionic silicone polymers include silicones that incorporate carboxylic, sulphate, sulphonic, phosphate and/or phosphonate functionality. Preferred anionic silicone polymers incorporated carboxyl functionality (e.g., carboxylic acid or carboxylate anion). Preferred anionic silicone polymers have a weight average molecular weight of 1,000 to 100,000 Daltons (preferably, 2,000 to 50,000 Daltons; more preferably, 5,000 to 50,000 Daltons; most preferably, 10,000 to 50,000 Daltons). Preferably, the anionic silicone polymer has an anionic group content of at least 1 mol % (more preferably, at least 2 mol %). Preferably, the anionic groups on the anionic silicone polymer are not located on the terminal position of the longest linear silicone chain. Preferred anionic silicone polymers have anionic groups at a midchain position on the silicone. More preferred anionic silicone polymers have anionic groups located at least 5 silicone atoms from a terminal position on the longest linear silicone chain in the anionic silicone polymer.

Preferably, the fabric care composition of the present invention, comprises: 0.1 to 10 wt % (more preferably, 0.5 to 8 wt %; still more preferably, 1 to 7.5 wt %; most preferably, 2.5 to 6 wt %), based on weight of the fabric care composition, of a fabric care benefit agent; wherein the fabric care benefit agent includes a fragrance. More preferably, the fabric care composition of the present invention further comprises: 0 to 10 wt % (preferably, 0.1 to 10 wt %), based on the weight of the fabric care composition, of a fragrance; wherein the fragrance includes an essential oil. Most preferably, the fabric care composition of the present invention further comprises: 0 to 10 wt % (preferably, 0.1 to 10 wt %), based on the weight of the fabric care composition, of a fragrance; wherein the fragrance includes esters (e.g., geranyl acetate); terpenes (e.g., geranol, citronellol, linalool, limonene) and aromatic compounds (e.g., vanilla, eugenol).

Preferably, the fabric care composition of the present invention, comprises: 0.1 to 15 wt % (preferably, 0.5 to 10 wt %; more preferably, 0.75 to 7.5 wt %; still more preferably, 1 to 5 wt %; most preferably, 2 to 3 wt %), based on weight of the fabric care composition, of the deposition aid polymer, comprising: (a) >50 to 99 wt % (preferably, 60 to 98 wt %; more preferably, 75 to 97 wt %; still more preferably, 82 to 96 wt %; most preferably, 90 to 95 wt %), based on weight of the deposition aid polymer, of structural units of formula (I)

(I)

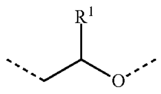

wherein each $R^1$ is independently selected from the group consisting of a hydrogen, a $—C_{1-4}$ alkyl group and a $—CH_2OR^3$ group (preferably, a hydrogen, a $—C_{1-4}$ alkyl group and a mixture thereof; more preferably, a hydrogen, a $—C_{1-2}$ alkyl group and a mixture thereof; still more preferably, a hydrogen, a methyl group and a mixture thereof; most preferably, a hydrogen); wherein each $R^3$ is independently selected from the group consisting of a $—C_{1-12}$ alkyl group and a phenyl group; and (b) 1 to <50 wt % (preferably, 2 to 40 wt %; more preferably, 3 to 25 wt %; still more preferably, 4 to 18 wt %; most preferably, 5 to 10 wt %), based on weight of the deposition aid polymer, of structural units of formula (II)

(II)

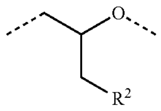

wherein each $R^2$ is independently selected from the group consisting of a moiety of Formula (III), a moiety of Formula (IV) and a moiety of Formula (V)

(III)

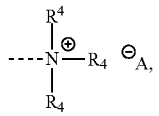

(IV)

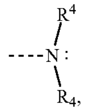

and (V)

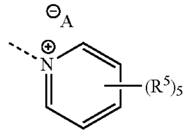

wherein $A^-$ is a counter anion balancing the cationic charge on the N; wherein each $R^4$ is independently selected from the group consisting of a hydrogen, a $—C_{1-12}$ alkyl group and a phenyl group (preferably, a hydrogen and a $—C_{1-12}$ alkyl group; more preferably, a hydrogen and a $—C_{1-4}$ alkyl group; still more preferably, a hydrogen and a $—C_{1-2}$ alkyl group; most preferably, a hydrogen and a methyl group); and wherein each $R^5$ is independently selected from the group consisting of a hydrogen and a $—C_{1-8}$ alkyl group (preferably, a hydrogen and a $—C_{1-4}$ alkyl group; more preferably, a hydrogen and a methyl group; most preferably, a hydrogen); wherein the deposition aid polymer has a weight average molecular weight of <100,000 Daltons; and with the proviso that the deposition aid polymer has an average of at least two (preferably, 2.5 to 300; more preferably, 3 to 50; still more preferably, 3 to 20; most preferably, 3.5 to 15) structural units of formula (II) per molecule.

Preferably, the deposition aid polymer has a weight average molecular weight, Mw, of <100,000 Daltons. More preferably, the deposition aid polymer has a weight average molecular weight of 2,000 to 90,000 Daltons. Still more preferably, the deposition aid polymer has a weight average molecular weight of 2,500 to 75,000 Daltons. Yet still more preferably, the deposition aid polymer has a weight average molecular weight of 3,000 to 50,000 Daltons. Most preferably, the deposition aid polymer has a weight average molecular weight of 12,000 to 30,000 Daltons.

Preferably, the deposition aid polymer comprises >50 to 99 wt % (preferably, 60 to 98 wt %; more preferably, 75 to 97 wt %; still more preferably, 82 to 96 wt %; most preferably, 90 to 95 wt %), based on weight of the deposition aid polymer, of structural units of formula (I), wherein each $R^1$ is independently selected from the group consisting of a hydrogen, a $—C_{1-4}$ alkyl group and a $—CH_2OR^3$ group; wherein each $R^3$ is independently selected from the group consisting of a $—C_{1-12}$ alkyl group and a phenyl group. More preferably, the deposition aid polymer comprises >50 to 99 wt % (preferably, 60 to 98 wt %; more preferably, 75 to 97 wt %; still more preferably, 82 to 96 wt %; most preferably, 90 to 95 wt %), based on weight of the deposition aid polymer, of structural units of formula (I), wherein each $R^1$ is independently selected from the group consisting of a hydrogen, a $—C_{1-4}$ alkyl group and a mixture thereof. Still more preferably, the deposition aid polymer comprises >50 to 99 wt % (preferably, 60 to 98 wt %; more preferably, 75 to 97 wt %; still more preferably, 82 to 96 wt %; most preferably, 90 to 95 wt %), based on weight of the deposition aid polymer, of structural units of formula (I), wherein each $R^1$ is independently selected from the group consisting of a hydrogen, a —$C_{1-2}$ alkyl group and a mixture thereof. Yet more preferably, the deposition aid polymer comprises >50 to 99 wt % (preferably, 60 to 98 wt %; more preferably, 75 to 97 wt %; still more preferably, 82 to 96 wt %; most preferably, 90 to 95 wt %), based on weight of the deposition aid polymer, of structural units of formula (I), wherein each $R^1$ is independently selected from the group consisting of a hydrogen, a methyl group and a mixture thereof. Most preferably, the deposition aid polymer comprises >50 to 99 wt % (preferably, 60 to 98 wt %; more preferably, 75 to 97 wt %; still more preferably, 82 to 96 wt %; most preferably, 90 to 95 wt %), based on weight of the deposition aid polymer, of structural units of formula (I), wherein each $R^1$ is independently selected from the group consisting of a hydrogen.

Preferably, the deposition aid polymer comprises 1 to <50 wt % (preferably, 2 to 40 wt %; more preferably, 3 to 25 wt %; still more preferably, 4 to 18 wt %; most preferably, 5 to 10 wt %), based on weight of the deposition aid polymer, of structural units of formula (II), wherein each $R^2$ is independently selected from the group consisting of a moiety of Formula (III), a moiety of Formula (IV) and a moiety of Formula (V); wherein $A^-$ is a counter anion balancing the cationic charge on the N (preferably, wherein $A^-$ is selected from the group consisting of $Cl^-$, $F^-$, $Br^-$ and $I^-$; more preferably, $Cl^-$ and $Br^-$; most preferably, $Cl^-$); wherein each $R^4$ is independently selected from the group consisting of a hydrogen, a —$C_{1-12}$ alkyl group and a phenyl group (preferably, a hydrogen and a —$C_{1-12}$ alkyl group; more preferably, a hydrogen and a —$C_{1-4}$ alkyl group; still more preferably, a hydrogen and a —$C_{1-2}$ alkyl group; most preferably, a hydrogen and a methyl group); and wherein each $R^5$ is independently selected from the group consisting of a hydrogen and a —$C_{1-8}$ alkyl group (preferably, a hydrogen and a —$C_{1-4}$ alkyl group; more preferably, a hydrogen and a methyl group; most preferably, a hydrogen); and with the proviso that the deposition aid polymer has an average of at least two (preferably, 2.5 to 300; more preferably, 3 to 50; still more preferably, 3 to 20; most preferably, 3.5 to 15) structural units of formula (II) per molecule. More preferably, the deposition aid polymer comprises 1 to <50 wt % (preferably, 2 to 40 wt %; more preferably, 3 to 25 wt %; still more preferably, 4 to 18 wt %; most preferably, 5 to 10 wt %), based on weight of the deposition aid polymer, of structural units of formula (II), wherein each $R^2$ is independently selected from the group consisting of a moiety of Formula (III) and a moiety of Formula (IV); wherein each $R^4$ is independently selected from the group consisting of a hydrogen, a —$C_{1-12}$ alkyl group (preferably, a —$C_{1-8}$ alkyl group; more preferably, a —$C_{1-4}$ alkyl group; most preferably, a methyl group) and a phenyl group; and with the proviso that the deposition aid polymer has an average of at least two (preferably, 2.5 to 300; more preferably, 3 to 50; still more preferably, 3 to 20; most preferably, 3.5 to 15) structural units of formula (II) per molecule. Preferably, when $R^2$ is a moiety of Formula (III), at least one (preferably, at least two; more preferably, all three) of the $R^4$ groups is a —$C_{1-12}$ alkyl group (preferably, a —$C_{1-4}$ alkyl group; more preferably, a —$C_{1-2}$ alkyl group; most preferably, a methyl group). Preferably, when $R^2$ is a moiety of Formula (IV), at least one (preferably, both) of the $R^4$ groups is a —$C_{1-12}$ alkyl group (preferably, a —$C_{1-4}$ alkyl group; more preferably, a —$C_{1-2}$ alkyl group; most preferably, a methyl group). Most preferably, the deposition aid polymer comprises 1 to <50 wt % (preferably, 2 to 40 wt %; more preferably, 3 to 25 wt %; still more preferably, 4 to 18 wt %; most preferably, 5 to 10 wt %), based on weight of the deposition aid polymer, of structural units of formula (II), wherein each $R^2$ is a moiety of Formula (IV); wherein at least one (preferably, both) of the $R^4$ groups is a —$C_{1-12}$ alkyl group (preferably, a —$C_{1-4}$ alkyl group; more preferably, a —$C_{1-2}$ alkyl group; most preferably, a methyl group); and with the proviso that the deposition aid polymer has an average of at least two (preferably, 2.5 to 300; more preferably, 3 to 50; still more preferably, 3 to 20; most preferably, 3.5 to 15) structural units of formula (II) per molecule.

Preferably, the deposition aid polymer comprises ≤1 wt %, based on weight of the deposition aid polymer, of active moieties capable of forming covalent bonds with cellulose (e.g., azetidinium groups, epoxide groups, halomethyl groups (e.g., chloromethyl moieties, fluoromethyl moieties)). More preferably, the deposition aid polymer comprises ≤0.5 wt %, based on weight of the deposition aid polymer, of active moieties capable of forming covalent bonds with cellulose (e.g., azetidinium groups, epoxide groups, halomethyl groups (e.g., chloromethyl moieties, fluoromethyl moieties)). Still more preferably, the deposition aid polymer comprises ≤0.2 wt %, based on weight of the deposition aid polymer, of active moieties capable of forming covalent bonds with cellulose (e.g., azetidinium groups, epoxide groups, halomethyl groups (e.g., chloromethyl moieties, fluoromethyl moieties)). Yet more preferably, the deposition aid polymer comprises ≤0.1 wt %, based on weight of the deposition aid polymer, of active moieties capable of forming covalent bonds with cellulose (e.g., azetidinium groups, epoxide groups, halomethyl groups (e.g., chloromethyl moieties, fluoromethyl moieties)). Still yet more preferably, the deposition aid polymer comprises ≤0.01 wt %, based on weight of the deposition aid polymer, of active moieties capable of forming covalent bonds with cellulose (e.g., azetidinium groups, epoxide groups, halomethyl groups (e.g., chloromethyl moieties, fluoromethyl moieties)). Most preferably, the deposition aid polymer comprises <the detectable limit of active moieties capable of forming covalent bonds with cellulose (e.g., azetidinium groups, epoxide groups, halomethyl groups (e.g., chloromethyl moieties, fluoromethyl moieties)).

Preferably, the deposition aid polymer comprises ≤1 wt %, based on weight of the deposition aid polymer, of carboxylic acid moieties. More preferably, the deposition aid polymer comprises ≤0.5 wt %, based on weight of the deposition aid polymer, of carboxylic acid moieties. Still more preferably, the deposition aid polymer comprises ≤0.2 wt %, based on weight of the deposition aid polymer, of carboxylic acid moieties. Yet more preferably, the deposition aid polymer comprises ≤0.1 wt %, based on weight of the deposition aid polymer, of carboxylic acid moieties. Still yet more preferably, the deposition aid polymer comprises ≤0.01 wt %, based on weight of the deposition aid polymer, of carboxylic acid moieties. Most preferably, the deposition aid polymer comprises <the detectable limit of carboxylic acid moieties.

Preferably, the deposition aid polymer comprises ≤1 wt %, based on weight of the deposition aid polymer, of carbonyl moieties. More preferably, the deposition aid polymer comprises ≤0.5 wt %, based on weight of the deposition aid polymer, of carbonyl moieties. Still more preferably, the deposition aid polymer comprises ≤0.2 wt %, based on weight of the deposition aid polymer, of carbonyl moieties.

Yet more preferably, the deposition aid polymer comprises ≤0.1 wt %, based on weight of the deposition aid polymer, of carbonyl moieties. Still yet more preferably, the deposition aid polymer comprises ≤0.01 wt %, based on weight of the deposition aid polymer, of carbonyl moieties. Most preferably, the deposition aid polymer comprises <the detectable limit of carbonyl moieties.

Preferably, the deposition aid polymer comprises: (a) 82 to 96 wt %, based on weight of the deposition aid polymer, of structural units of formula (I), wherein each $R^1$ is independently selected from a hydrogen and a —$C_{1-4}$ alkyl group; and (b) 4 to 18 wt %, based on weight of the deposition aid polymer, of structural units of formula (II), wherein each $R^2$ is independently selected from the group consisting of a moiety of Formula (III) and a moiety of Formula (IV); wherein each $R^4$ is independently selected from the group consisting of a hydrogen and a —$C_{1-8}$ alkyl group; wherein the deposition aid polymer contains less than the detectable limit of azetidinium moieties, carboxylic acid moieties, carbonyl moieties and halomethyl moieties (e.g., chloromethyl moieties, fluoromethyl moieties); wherein the deposition aid polymer has a weight average molecular weight of 5,000 to 30,000 Daltons; and with the proviso that the deposition aid polymer has an average of at least two (preferably, 2.5 to 300; more preferably, 3 to 50; still more preferably, 3 to 20; most preferably, 3.5 to 15) structural units of formula (II) per molecule. More preferably, the deposition aid polymer comprises: (a) 82 to 96 wt %, based on weight of the deposition aid polymer, of structural units of formula (I), wherein each $R^1$ is independently selected from a hydrogen and a methyl group; and (b) 4 to 18 wt %, based on weight of the deposition aid polymer, of structural units of formula (II), wherein each $R^2$ is independently selected from the group consisting of a moiety of Formula (III) and a moiety of Formula (IV); wherein each $R^4$ is a methyl group; wherein the deposition aid polymer contains less than the detectable limit of azetidinium moieties, carboxylic acid moieties, carbonyl moieties and halomethyl moieties (e.g., chloromethyl moieties, fluoromethyl moieties); wherein the deposition aid polymer has a weight average molecular weight of 5,000 to 30,000 Daltons; and with the proviso that the deposition aid polymer has an average of at least two (preferably, 2.5 to 300; more preferably, 3 to 50; still more preferably, 3 to 20; most preferably, 3.5 to 15) structural units of formula (II) per molecule. Most preferably, the deposition aid polymer comprises: (a) 82 to 96 wt %, based on weight of the deposition aid polymer, of structural units of formula (I), wherein each $R^1$ is a hydrogen; and (b) 4 to 18 wt %, based on weight of the deposition aid polymer, of structural units of formula (II), wherein each $R^2$ is a moiety of Formula (IV); wherein each $R^4$ is a methyl group; wherein the deposition aid polymer contains less than the detectable limit of azetidinium moieties, carboxylic acid moieties, carbonyl moieties and halomethyl moieties (e.g., chloromethyl moieties, fluoromethyl moieties); wherein the deposition aid polymer has a weight average molecular weight of 5,000 to 30,000 Daltons; and with the proviso that the deposition aid polymer has an average of at least two (preferably, 2.5 to 300; more preferably, 3 to 50; still more preferably, 3 to 20; most preferably, 3.5 to 15) structural units of formula (II) per molecule.

Preferably, the fabric care composition of the present invention, further comprises a liquid carrier. More preferably, the fabric care composition of the present invention, comprises 0 to 99.8 wt % (preferably, 25 to 93 wt %; more preferably, 40 to 88.25 wt %; yet more preferably, 50 to 89.9 wt %; most preferably, 60 to 82.5 wt %), based on weight of the fabric care composition, of a liquid carrier. Still more preferably, the fabric care composition of the present invention, comprises 0 to 99.8 wt % (preferably, 25 to 93 wt %; more preferably, 40 to 88.25 wt %; yet more preferably, 50 to 89.9 wt %; most preferably, 60 to 82.5 wt %), based on weight of the fabric care composition, of a liquid carrier; wherein the liquid carrier comprises water. Most preferably, the fabric care composition of the present invention, comprises 0 to 99.8 wt % (preferably, 25 to 93 wt %; more preferably, 40 to 88.25 wt %; yet more preferably, 50 to 89.9 wt %; most preferably, 60 to 82.5 wt %), based on weight of the fabric care composition, of a liquid carrier; wherein the liquid carrier comprises a mixture of water and an organic solvent.

Preferably, the fabric care composition of the present invention, further comprises a liquid carrier; wherein the liquid carrier includes water. More preferably, the fabric care composition of the present invention, comprises: 10 to 93 wt % (preferably, 25 to 90 wt %; more preferably, 40 to 75 wt %; most preferably, 50 to 65 wt %), based on the weight of the fabric care composition, of water. Still more preferable, the fabric care composition of the present invention, comprises: 10 to 93 wt % (preferably, 25 to 90 wt %; more preferably, 40 to 75 wt %; most preferably, 50 to 65 wt %), based on the weight of the fabric care composition, of water, wherein the water is at least one of distilled water and deionized water. Most preferably, the fabric care composition of the present invention, comprises: 10 to 93 wt % (preferably, 25 to 90 wt %; more preferably, 40 to 75 wt %; most preferably, 50 to 65 wt %), based on the weight of the fabric care composition, of water, wherein the water is distilled and deionized.

Preferably, the fabric care composition of the present invention, further comprises a liquid carrier; wherein the liquid carrier includes an organic solvent. More preferably, the fabric care composition of the present invention, comprises: 0.1 to 50 wt % (preferably, 0.5 to 25 wt %; more preferably, 1 to 15 wt %; most preferably, 4 to 10 wt %), based on the weight of the fabric care composition, of an organic solvent. Still more preferable, the fabric care composition of the present invention, comprises: 0.1 to 50 wt % (preferably, 0.5 to 25 wt %; more preferably, 1 to 15 wt %; most preferably, 4 to 10 wt %), based on the weight of the fabric care composition, of an organic solvent, wherein the organic solvent is selected from the group consisting of ethanol; propylene glycol; glycerol; 1,3-butanediol; 1,3-hexanediol; dipropylene glycol and mixtures thereof. Most preferably, the fabric care composition of the present invention, comprises: 0.1 to 50 wt % (preferably, 0.5 to 25 wt %; more preferably, 1 to 15 wt %; most preferably, 4 to 10 wt %), based on the weight of the fabric care composition, of an organic solvent, wherein the organic solvent is a mixture of ethanol and propylene glycol.

Preferably, the fabric care composition of the present invention, further comprises: a cleaning surfactant. More preferably, the fabric care composition of the present invention, comprises: 0 to 60 wt % (more preferably, 5 to 40 wt %; still more preferably, 7.5 to 30 wt %; most preferably, 10 to 25 wt %), based on the weight of the fabric care composition, of a cleaning surfactant. Still more preferably, the fabric care composition of the present invention, comprises: 0 to 60 wt % (more preferably, 5 to 40 wt %; still more preferably, 7.5 to 30 wt %; most preferably, 10 to 25 wt %), based on the weight of the fabric care composition, of a cleaning surfactant; wherein the cleaning surfactant is selected from the group consisting of anionic surfactants, nonionic surfactants, cationic surfactants, amphoteric surfactants and mixtures thereof. Yet still more preferably, the fabric care composition of the present invention, comprises: 0 to 60 wt % (more preferably, 5 to 40 wt %; still more preferably, 7.5 to 30 wt %; most preferably, 10 to 25 wt %), based on the weight of the fabric care composition, of a cleaning surfactant; wherein the cleaning surfactant is selected from the group consisting of a mixture including an anionic surfactant and a non-ionic surfactant. Most preferably, the fabric care composition of the present invention, comprises: 0 to 60 wt % (more preferably, 5 to 40 wt %; still more preferably, 7.5 to 30 wt %; most preferably, 10 to 25 wt %), based on the weight of the fabric care composition, of a cleaning surfactant; wherein the cleaning surfactant includes a mixture of a linear alkyl benzene sulfonate, a sodium lauryl ethoxysulfate and a nonionic alcohol ethoxylate.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters and mixtures thereof. More preferred anionic surfactants include $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate and mixtures thereof.

Non-ionic surfactants include secondary alcohol ethoxylates, ethoxylated 2-ethylhexanol, ethoxylated seed oils, butanol caped ethoxylated 2-ethylhexanol and mixtures thereof. Preferred non-ionic surfactants include secondary alcohol ethoxylates.

Cationic surfactants include quaternary surface active compounds. Preferred cationic surfactants include quaternary surface active compounds having at least one of an ammonium group, a sulfonium group, a phosphonium group, an iodinium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride di-tallow dimethyl ammonium chloride and di-tallow dimethyl ammonium chloride. Most preferred cationic surfactant includes di-tallow dimethyl ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the fabric care composition of the present invention, further comprises: a builder. More preferably, the fabric care composition of the present invention, comprises: 0 to 60 wt % (more preferably, 1 to 50 wt %; still more preferably, 2.5 to 25 wt %; most preferably, 3 to 7 wt %), based on weight of the fabric care composition, of a builder. Still more preferably, the fabric care composition of the present invention, comprises: 0 to 60 wt % (more preferably, 1 to 50 wt %; still more preferably, 2.5 to 25 wt %; most preferably, 3 to 7 wt %), based on weight of the fabric care composition, of a builder; wherein the builder; wherein the builder is selected from the group consisting of inorganic builders (e.g., tripolyphosphate, pyrophosphate); alkali metal carbonates; borates; bicarbonates; hydroxides; zeolites; citrates (e.g., sodium citrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta(methylenephosphonic acid); salts of diethylenetriaminepenta(methylenephosphonic acid); ethylenediaminetetraethylene-phosphonic acid; salts of ethylenediaminetetraethylene-phosphonic acid; oligomeric phosphonates; polymeric phosphonates; mixtures thereof. Most preferably, the fabric care composition of the present invention, comprises: 0 to 60 wt % (more preferably, 1 to 50 wt %; still more preferably, 2.5 to 25 wt %; most preferably, 3 to 7 wt %), based on weight of the fabric care composition, of a builder; wherein the builder includes a citrate (preferably, sodium citrate).

Preferably, the fabric care composition of the present invention is selected from the group consisting of a fabric softener and a laundry detergent. More preferably, the fabric care composition of the present invention is a laundry detergent.

Preferably, the fabric care composition of the present invention optionally further comprises additives selected from the group consisting of builders (e.g., sodium bicarbonate, sodium carbonate, zeolites, sodium citrate, sodium tripolyphosphate and aminocarboxylates (such as methylglycine diacetic acid, sodium salt or glutamic acid diacetic acid, sodium salt), hydrotropes (e.g., sodium xylene sulfonate), enzymes (e.g., protease, cellulases, lipase, amylase, mannanases), preservatives, perfumes (e.g., essential oils such as D-limonene), fluorescent whitening agents, bleach (e.g., sodium percarbonate, sodium perborate, sodium hypochlorite), dyes, additive polymers (e.g., dispersant polymers such as acrylic acid homopolymers and copolymers of acrylic acid with maleic acid, sulfonated monomer and/or ethyl acrylate) and mixtures thereof.

Preferably, the fabric care composition of the present invention further comprises: 0 to 10 wt %, based on the weight of the fabric care composition, of a hydrotrope. More preferably, the fabric care composition of the present invention further comprises: 0 to 10 wt % (preferably, 1 to 10 wt %; more preferably, 2 to 8 wt %; most preferably, 5 to 7.5 wt %), based on the weight of the fabric care composition, of a hydrotrope; wherein the hydrotrope is selected from the group consisting of calcium, sodium, potassium, ammonium and alkanol ammonium salts of xylene sulfonic acid, toluene sulfonic acid, ethylbenzene sulfonic acid and cumene sulfonic acid; salts thereof and mixtures thereof. Most preferably, the fabric care composition of the present invention further comprises: 0 to 10 wt %, based on the weight of the fabric care composition, of a hydrotrope; wherein the hydrotrope includes sodium xylene sulfonate.

Preferably, the fabric care composition is in a liquid form having a pH from 6 to 12.5; preferably at least 6.5, preferably at least 7, preferably at least 7.5; preferably no greater than 12.25, preferably no greater than 12, preferably no greater than 11.5. Suitable bases to adjust the pH of the formulation include mineral bases such as sodium hydroxide (including soda ash) and potassium hydroxide; sodium bicarbonate, sodium silicate, ammonium hydroxide; and organic bases such as mono-, di- or tri-ethanolamine; or 2-dimethylamino-2-methyl-1-propanol (DMAMP). Mixtures of bases may be used. Suitable acids to adjust the pH of the aqueous medium include mineral acid such as hydrochloric acid, phosphorus acid, and sulfuric acid; and organic acids such as acetic acid. Mixtures of acids may be used. The formulation may be adjusted to a higher pH with base and then back titrated to the ranges described above with acid.

The present invention provides a method of treating an article of laundry, comprising: providing an article of laundry; providing a fabric care composition of the present invention; providing a bath water; and applying the bath water and the fabric care composition to the article of laundry to provide a treated article of laundry; wherein the fabric care benefit agent is associated with the treated article of laundry (preferably, wherein the fabric care benefit agent is not covalently bonded to the treated article of laundry). More preferably, the present invention provides a method of treating an article of laundry, comprising: providing an article of laundry; providing a fabric care composition of the present invention; providing a bath water; and applying the bath water and the fabric care composition to the article of laundry to provide a treated article of laundry; wherein the fabric care benefit agent is associated with the treated article of laundry (preferably, wherein the fabric care benefit agent is not covalently bonded to the treated article of laundry) and wherein the deposition aid polymer improves the laundry delivery efficacy of the fabric care benefit agent.

Some embodiments of the present invention will now be described in detail in the following Examples.

The abbreviations listed in the following table are used in the examples.

| Abbreviation | Meaning |
|---|---|
| ECH | Epichlorohydrin |
| EDTA-4Na | Ethylenediamine-N,N,N',N'-tetraacetic acid, tetrasodium salt |
| EO | Ethylene oxide |
| MEA | Monoethanolamine |
| $M_n$ | Number average molecular weight |
| $M_w$ | Weight average molecular weight |
| PO | Propylene oxide |
| PTFE | Poly(tetrafluoroethylene) |
| RT | Room temperature |
| SEC | Size exclusion chromatography |
| SLES | Lauryl alcohol ethoxylate, sodium salt |
| THF | Tetrahydrofuran |
| TiBA | Triisobutylaluminum |
| XPS | X-ray photoelectron spectroscopy |

Analytical Methods

Molecular Weight Analysis of Epichlorohydrin Copolymers

| | |
|---|---|
| Sample Prep: | 2 mg/mL in THF; solutions were filtered with 0.45 μm nylon syringe filter into autosampler vials before injection |
| Pump: | Waters Model e2695 at a nominal flow rate of 1.0 mL/min |
| Eluent: | 0.2M sodium nitrate and 0.02% sodium azide in water |
| Injector: | Waters Model e2695 set to inject 100 μL |
| Columns: | Two Tosoh GMPWXL columns, held at 35° C. |
| Detection: | Shodex RI-201 differential refractive index (DRI) |
| Data system: | PL Cirrus, version 3.3 |
| Calibration: | 12 narrow poly(ethylene oxide) standards from Polymer labs, fit to a 1$^{st}$ order polynomial curve over the range of 863.5 kg/mol to 0.610 kg/mol. |

Molecular Weight Analysis of Amine-Functionalized Copolymers

All samples were prepared in the GPC mobile phase at 5 mg/mL. The accurate concentration of each sample was recorded. The samples were shaken for at least 2 hrs on a horizontal shaker at ambient temperature to expedite the dissolution process. Prepared samples were then filtered using 45 μm nylon syringe filter into autosampler vials before injection. No resistance was observed during the filtration process for any of the exemplified amine-functionalized polymers.

The GPC instrument setup used consisted of a Waters Alliance 2690 Separation Module (degasser, pump, autosampler and column oven) and Wyatt Optilab UT-rEX refractive index detector (RI). A waters e-SAT/IN module was used to translate analog signals from the RI detector to digital signals for data collection. Empower 3 was used for data acquisition and process.

GPC Conditions:

| | |
|---|---|
| Columns: | TOSOH TSKgel G5000PWxl-CP and G5000PWxl-CP columns (7.8 mm ID × 300 mm L) |
| Mobile phase: | 100 mM ammonium formate pH 3 |
| Flow rate: | 0.5 mL/min |
| Sample solvent: | Same as mobile phase |
| Sample concentration: | 5 mg/mL |
| Injected volume of sample solution: | 50 μL |
| Concentration detection: | Refractive index detector |
| Column calibration standards: | Easivial PEG/PEO premixed poly(ethylene oxide) molecular weight standards from Agilent Technology |
| Calibration curve: | 3$^{rd}$ order fit for the PEO standards with peak molecular weight of 1,378,000; 942,000; 542,500; 122,200; 64,850; 29,420; 16,100; 3,860; 1,450; 610; 194; 104 g/mol |
| Integration limit: | End at around 38.5 min |

NMR Analysis of ECH Copolymers

All samples were prepared in the GPC mobile phase at 5 mg/mL. The accurate concentration of each sample was recorded. The samples were shaken for at least 2 hrs on a horizontal shaker at ambient temperature to expedite the dissolution process. Prepared samples were then filtered using 45 μm nylon syringe filter into autosampler vials before injection. No resistance was observed during the filtration process for any of the exemplified amine-functionalized polymers.

Molecular Weight Analysis of Amine-Functionalized Copolymers

Sample preparation: 500 mg of sample dissolved in 2.2 mL acetone-$d_6$ containing 5 mM relaxation agent to form a homogeneous solution that was then transferred to a 10 mm NMR tube. Quantitative $^{13}C$ NMR spectroscopy was conducted on a Bruker 600 MHz spectrometer equipped with a 10 mm cryogenic probe using the following parameters. Pulsed-field-gradient NMR allowed diffusion measurement to quantify molecular weight using a 0.1 wt % solution in $CDCl_3$ containing 2 mM relaxation agent. Diffusion measurement was conducted on a 400 MHz instrument equipped with a 5 mm BBO probe. Repetition time: 7 s; number of scans: 128; 90° pulse: 12 μs; T: 25° C.; spectrum width: 240 ppm; spectrum center: 90 ppm.

XPS Analysis of Cotton Fabric

| | |
|---|---|
| Instrument: | Thermo K-alpha XPS |
| X-ray source: | Monochromatic Al Kα 72 Watts (12 kV, 6 mA) |
| Analyzer Pass Energy: | 200 eV (survey spectra: 50 msec, 1 eV/step, 5 scans; 80 eV (quantitation scans: 50 msec, 0.15 eV/step, 5 scans); 20 eV (high resolution carbon spectra: 50 msec, 0.1 eV/step, 15 scans) |
| Take-Off Angle: | 400 μm |
| Auto height: | on |
| Analysis Area: | 400 μm oval |
| Flood gun: | on |
| Data processing: | Thermo Advantage software with Thermo's modified XPS sensitivity factors. |

Minimum of 4 areas analyzed per sheet with 2 sheets analyzed per formulation tested

Example P1: EO-ECH Polymer

Syringes were charged under an inert atmosphere with ECH (4.63 mL) and toluene (150 mL), capped with sealed GC vials and then added to a 300 mL stainless steel pressure reactor equipped with a stirrer utilizing a gas entrainment impeller blade. Temperature was controlled with a mantle through resistive heating and cooling water fed through an internal cooling loop using a research control valve. The reactor had been dried at 100° C. and thoroughly purged with nitrogen. The reactor was pressurized with ~15 psig nitrogen followed by the addition of EO (8.85 mL) using the Camille reactor control system. The reaction mixture was heated to 40° C. The catalyst mixture in toluene (6 mL) was prepared in a glove box from TiBA (25% in toluene, 2.48 g) and triethylamine (79 mg), taken up in a syringe, capped and removed from the box. The catalyst mixture was added to the shot tank and charged into the reactor.

An immediate exotherm was observed of ~4° C. and an additional ~9 mL of EO was added to maintain pressure over about 1 h. The mixture was then quenched by addition of ethanol (6 mL) through the shot tank. After cooling to RT, purging with nitrogen, the mixture was removed from the reactor, and concentrated on a rotovap. The mixture was transferred to a jar and dried further at 50° C. using the glove box vacuum pump. The product polymer (12.2 g) was isolated. The ECH content of the polymer was found by quantitative $^{13}C$ NMR to be 16 wt %. The polymer $M_w$ and $M_n$ by GPC were 11.9 and 2.9 kDa, respectively.

Example P2: EO-ECH Polymer

Syringes were charged under an inert atmosphere with ECH (1.54 mL) and toluene (150 mL), capped with sealed GC vials and then added to a 300 mL stainless steel pressure reactor equipped with a stirrer utilizing a gas entrainment impeller blade. Temperature was controlled with a mantle through resistive heating and cooling water fed through an internal cooling loop using a research control valve. The reactor had been dried at 100° C. and thoroughly purged with nitrogen. The reactor was pressurized with ~15 psig nitrogen followed by the addition of EO (8.85 mL) using the Camille reactor control system. The reaction mixture was heated to 40° C. The catalyst mixture in toluene (8 mL) was prepared in a glove box from TiBA (25% in toluene, 1.86 g) and tetraoctylammonium bromide (427 mg), taken up in a syringe, capped and removed from the box. The catalyst mixture was added to the shot tank and charged into the reactor.

An immediate exotherm was observed of ~3° C. and an additional ~9 mL of EO was added to maintain pressure over about 1 h. The mixture was then quenched by addition of ethanol (6 mL) through the shot tank. After cooling to RT, purging with nitrogen, the mixture was removed from the reactor, and concentrated on a rotovap. The mixture was transferred to a jar and dried further at 50° C. using the glove box vacuum pump. The product polymer (14.0 g) was isolated. The ECH content of the polymer was found by quantitative $^{13}C$ NMR to be 6.4 wt %. The polymer $M_w$ and $M_n$ by GPC were 25.6 and 9.3 kDa, respectively.

Example P3: EO-ECH Polymer

Syringes were charged under an inert atmosphere with ECH (3.09 mL) and toluene (150 mL), capped with sealed GC vials and then added to a 300 mL stainless steel pressure reactor equipped with a stirrer utilizing a gas entrainment impeller blade. Temperature was controlled with a mantle through resistive heating and cooling water fed through an internal cooling loop using a research control valve. The reactor had been dried at 100° C. and thoroughly purged with nitrogen. The reactor was pressurized with ~15 psig nitrogen followed by the addition of EO (8.85 mL) using the Camille reactor control system. The reaction mixture was heated to 40° C. The catalyst mixture in toluene (8 mL) was prepared in a glove box from TiBA (25% in toluene, 3.71 g) and tetraoctylammonium bromide (853 mg), taken up in a syringe, capped and removed from the box. The catalyst mixture was added to the shot tank and charged into the reactor.

An immediate exotherm was observed of ~3° C. and an additional ~9 mL of EO was added to maintain pressure over about 1 h. The mixture was then quenched by addition of ethanol (6 mL) through the shot tank. After cooling to RT, purging with nitrogen, the mixture was removed from the reactor, and concentrated on a rotovap. The mixture was transferred to a jar and dried further at 50° C. using the glove box vacuum pump. The product polymer (7.4 g) was isolated. The ECH content of the polymer was found by quantitative $^{13}C$ NMR to be 10.6 wt %. The polymer $M_w$ and $M_n$ by GPC were 9.9 and 3.1 kDa, respectively.

Example P4: EO-ECH Polymer

Syringes were charged under an inert atmosphere with ECH (9.26 mL) and toluene (150 mL), capped with sealed GC vials and then added to a 300 mL stainless steel pressure reactor equipped with a stirrer utilizing a gas entrainment impeller blade. Temperature was controlled with a mantle through resistive heating and cooling water fed through an internal cooling loop using a research control valve. The reactor had been dried at 100° C. and thoroughly purged with nitrogen. The reactor was pressurized with ~15 psig nitrogen followed by the addition of EO (8.85 mL) using the Camille reactor control system. The reaction mixture was heated to 40° C. The catalyst mixture in toluene (8 mL) was prepared in a glove box from TiBA (25% in toluene, 3.71 g) and tetraoctylammonium bromide (853 mg), taken up in a syringe, capped and removed from the box. The catalyst mixture was added to the shot tank and charged into the reactor.

An immediate exotherm was observed of ~3° C. and an additional ~9 mL of EO was added to maintain pressure over about 1 h. The mixture was then quenched by addition of ethanol (6 mL) through the shot tank. After cooling to RT, purging with nitrogen, the mixture was removed from the reactor, and concentrated on a rotovap. The mixture was transferred to a jar and dried further at 50° C. using the glove box vacuum pump. The product polymer (19.2 g) was isolated. The ECH content of the polymer was found by quantitative $^{13}C$ NMR to be 27.8 wt %.

Example P5: EO-PO-ECH Polymer

Syringes were charged under an inert atmosphere with ECH (3.09 mL), PO (8.26 mL) and toluene (150 mL), capped with sealed GC vials and then added to a 300 mL stainless steel pressure reactor equipped with a stirrer utilizing a gas entrainment impeller blade. Temperature was controlled with a mantle through resistive heating and cooling water fed through an internal cooling loop using a research control valve. The reactor had been dried at 100° C. and thoroughly purged with nitrogen. The reactor was pressurized with ~15 psig nitrogen followed by the addition of EO (8.85 mL) using the Camille reactor control system. The reaction mixture was heated to 40° C. The catalyst mixture in toluene (8 mL) was prepared in a glove box from TiBA (25% in toluene, 3.71 g) and tetraoctylammonium bromide (853 mg), taken up in a syringe, capped and removed from the box. The catalyst mixture was added to the shot tank and charged into the reactor.

No exotherm was observed and reactor pressure stayed constant. The mixture was heated to 60° C. and held for 72 hours. The mixture was cooled, vented and purged with nitrogen. The mixture was transferred to ajar and dried further at 60° C. using the glove box vacuum pump. The product polymer (12.0 g) was isolated.

Example P6: Amine Reacted EO-ECH Polymer

A Fisher Porter tube containing a PTFE-covered magnetic stirbar was charged with 8.64 g of copolymer prepared according to Example P1 and 7.81 mL of a 45 wt % solution of trimethylamine. The solution was stirred and 20 mL distilled water was added to adjust the concentration of polymer. The Fisher Porter tube was sealed and the mixture was stirred at 125° C. for 16 hours. The solution was then cooled to room temperature and the pressure tube was vented. Nitrogen was bubbled through the solution for 1 hour to remove excess amine. The solvent was evaporated under reduced pressure and the crude polymer taken up in a minimal amount of methanol. The solution was added to diethyl ether (10× volume of methanol) with vigorous stirring to precipitate the polymer. The polymer was isolated as a brown oil (9.55 g). By quantitative $^{13}C$ NMR, the copolymer contained 77 wt % EO and 23 wt % N,N,N-trimethyl-2-oxiranemethanaminium chloride.

Example P7: Amine Reacted EO-ECH Polymer

A Fisher Porter tube containing a PTFE-covered magnetic stirbar was charged with 5.00 g of copolymer prepared according to Example P2 and 3.25 mL of a 45 wt % solution of trimethylamine. The solution was stirred and 15 mL distilled water was added to adjust the concentration of polymer. The Fisher Porter tube was sealed and the mixture was stirred at 125° C. for 16 hours. The solution was then cooled to room temperature and the pressure tube was vented. Nitrogen was bubbled through the solution for 1 hour to remove excess amine. The solvent was evaporated under reduced pressure and the crude polymer taken up in a minimal amount of methanol. The solution was added to diethyl ether (10× volume of methanol) with vigorous stirring to precipitate the polymer. The polymer was isolated as an off white powder (4.44 g). The polymer $M_w$ and $M_n$ by SEC were 25.9 and 13.5 kDa, respectively. The By quantitative $^{13}C$ NMR, the copolymer contained 93 wt % EO and 7 wt % N,N,N-trimethyl-2-oxiranemethanaminium chloride.

Example P8: Amine Reacted EO-ECH Polymer

A Fisher Porter tube containing a PTFE-covered magnetic stirbar was charged with 5.00 g of copolymer prepared according to Example P2 and 2.72 mL of a 45 wt % solution of trimethylamine. The solution was stirred and 15 mL distilled water was added to adjust the concentration of polymer. The Fisher Porter tube was sealed and the mixture was stirred at 125° C. for 16 hours. The solution was then cooled to room temperature and the pressure tube was vented. Nitrogen was bubbled through the solution for 1 hour to remove excess amine. The solvent was evaporated under reduced pressure and the crude polymer taken up in a minimal amount of methanol. The solution was added to diethyl ether (10× volume of methanol) with vigorous stirring to precipitate the polymer. The polymer was isolated as an off white powder (4.77 g). The polymer $M_w$ and $M_n$ by SEC were 37.4 and 17.9 kDa, respectively. The By quantitative $^{13}C$ NMR, the copolymer contained 92 wt % EO and 8 wt % N,N-dimethyl-2-oxiranemethanaminium chloride.

Example P9: Amine Reacted EO-ECH Polymer

A Fisher Porter tube containing a PTFE-covered magnetic stirbar was charged with 5.32 g of copolymer prepared according to Example P3 and 5.67 mL of a 45 wt % solution of trimethylamine. The solution was stirred and 15 mL distilled water was added to adjust the concentration of polymer. The Fisher Porter tube was sealed and the mixture was stirred at 125° C. for 16 hours. The solution was then cooled to room temperature and the pressure tube was vented. Nitrogen was bubbled through the solution for 1 hour to remove excess amine. The solvent was evaporated under reduced pressure and the crude polymer taken up in a minimal amount of methanol. The solution was added to diethyl ether (10× volume of methanol) with vigorous stirring to precipitate the polymer. The polymer was isolated as a light brown oil (5.12 g). The polymer $M_w$ and $M_n$ by SEC were 14.9 and 7.7 kDa, respectively. The By quantitative $^{13}C$ NMR, the copolymer contained 83 wt % EO and 17 wt % N,N,N-trimethyl-2-oxiranemethanaminium chloride.

Example P10: Amine Reacted EO-ECH Polymer

A Fisher Porter tube containing a PTFE-covered magnetic stirbar was charged with 5.56 g of copolymer prepared according to Example P4 and 15.5 mL of a 45 wt % solution of trimethylamine. The solution was stirred and 10 mL distilled water was added to adjust the concentration of polymer. The Fisher Porter tube was sealed and the mixture was stirred at 125° C. for 16 hours. The solution was then cooled to room temperature and the pressure tube was vented. Nitrogen was bubbled through the solution for 1 hour to remove excess amine. The solvent was evaporated under reduced pressure and the crude polymer taken up in a minimal amount of methanol. The solution was added to diethyl ether (10× volume of methanol) with vigorous stirring to precipitate the polymer. The polymer was isolated as a light brown oil (6.01 g). The polymer $M_w$ and $M_n$ by SEC were 16.9 and 6.9 kDa, respectively. The By quantitative $^{13}C$ NMR, the copolymer contained 62 wt % EO and 38 wt % N,N,N-trimethyl-2-oxiranemethanaminium chloride.

Example P11: Amine Reacted EO-ECH Polymer

A Fisher Porter tube containing a PTFE-covered magnetic stirbar was charged with 5.50 g of terpolymer prepared according to Example P5 and 10.5 mL of a 45 wt % solution of trimethylamine. The solution was stirred and 15 mL distilled water was added to adjust the concentration of polymer. The Fisher Porter tube was sealed and the mixture was stirred at 125° C. for 16 hours. The solution was then cooled to room temperature and the pressure tube was vented. Nitrogen was bubbled through the solution for 1 hour to remove excess amine. The solvent was evaporated under reduced pressure and the crude polymer taken up in a minimal amount of methanol. The solution was added to diethyl ether (10× volume of methanol) with vigorous stirring to precipitate the polymer. The polymer was isolated as a light brown oil (6.13 g). The polymer $M_w$ and $M_n$ by SEC were 2.1 and 1.5 kDa, respectively. The By quantitative $^{13}C$ NMR, the copolymer contained 62 wt % EO, 13 wt % PO and 25 wt % N,N,N-trimethyl-2-oxiranemethanaminium chloride.

Comparative Example C1 and Examples 1-4: Liquid Laundry Detergent

The liquid laundry detergent formulations used in the deposition tests in the subsequent Examples were prepared having the generic formulation as described in TABLE 1 with the deposition aid polymer as noted in TABLE 2 and were prepared by standard liquid laundry formulation preparation procedures.

TABLE 1

| Ingredient | Commercial Name | wt % |
|---|---|---|
| Linear alkyl benzene sulfonate | Nacconal 90G* | 12.0 |
| Sodium lauryl ethoxysulfate | Steol CS-460* | 4.0 |
| Ethanol | — | 2.0 |
| Propylene glycol | — | 5.0 |
| Non-ionic surfactant | Biosoft N25-7* | 6.0 |
| Sodium citrate | — | 5.0 |

TABLE 1-continued

| Ingredient | Commercial Name | wt % |
|---|---|---|
| Deposition aid polymer | as noted in Table 2 | 2.5 |
| Silicone emulsion | DOWSIL ™ By 22-840[a] | 5.0 |
| Deionized water | — | QS to 100 |

*available from Stepan Company
[a]available from The Dow Chemical Company

TABLE 2

| Example | Deposition Aid Polymer |
|---|---|
| Comparative Example C1 | None |
| 1 | Example P6 |
| 2 | Example P7 |
| 3 | Example P8 |
| 4 | Example P9 |

Silicone Deposition

The silicone deposition for the liquid laundry detergent formulations of Comparative Example C1 and Examples 1-4 were assessed in a Terg-o-tometer Model TOM-52-A available from SR Lab Instruments (6×1 L wells) agitated at 90 cycles per minute with the conditions noted in TABLE 3.

TABLE 3

| Parameter | Setting |
|---|---|
| Temperature | ambient |
| Water hardness | 200 ppm, Ca/Mg = 2/1 |
| Fabric Types (6 in each well) | Cotton 400 |
| Wash time | 16 minutes |
| Rinse time | 3 minutes |
| Liquid laundry detergent dosage | 1 g/L |

The fabric swatches were then dried and analyzed by X-ray photoelectron spectroscopy (XPS) for quantification of surface deposited silicone. The XPS results for Si, wt % deposition are provided in TABLE 4.

Friction measurements were then obtained for the fabric swatches using a tribometer apparatus described in Kalihari et al., *Rev. Sci. Instrum.* 2013, 84, 035104. The fabric swatches were adhered to glass substrates using double sided tape and secured on a unidirectional sliding deck. A ⅜" rigid nylon sphere was placed in contact with the fabric surface at an applied normal force, and the lateral force was measured as the cloth covered glass substrate was drawn unilaterally across the sphere surface. The process was performed at three forces with multiple replicates. The coefficient of friction was determined by calculating the slope between the measured lateral force and the applied normal force. The results are reported in TABLE 4.

TABLE 4

| Example | Deposition aid polymer | Si (wt %) | Coeff of Friction |
|---|---|---|---|
| C1 | None | 1.3 ± 0.6 | 0.156 ± 0.006 |
| 1 | Example P6 | 3.8 ± 0.6 | 0.118 ± 0.004 |
| 2 | Example P7 | 4.8 ± 0.9 | 0.110 ± 0.017 |
| 3 | Example P8 | 5.0 ± 0.2 | 0.117 ± 0.012 |
| 4 | Example P9 | 4.3 + 0.2 | 0.121 ± 0.004 |

We claim:

1. A fabric care composition comprising:

a fabric care benefit agent; and 1 to 5 wt %, based on weight of the fabric care composition, of a deposition aid polymer, comprising:

(a) 82 to 96 wt %, based on weight of the deposition aid polymer, of structural units of formula (I)

(I)

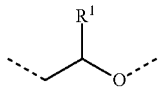

wherein each $R^1$ is independently selected from the group consisting of a hydrogen and a methyl group; and (b) 4 to 18 wt %, based on weight of the deposition aid polymer, of structural units of formula (II)

(II)

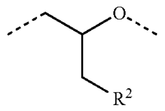

wherein each $R^2$ is independently selected from the group consisting of a moiety of Formula (III), a moiety of Formula (IV) and a moiety of Formula (V)

(III)

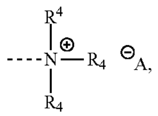

(IV)

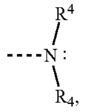

and (V)

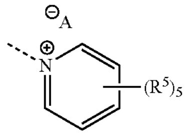

wherein $A^-$ is a counter anion balancing the cationic charge on the N; wherein each $R^4$ is independently selected from the group consisting of a hydrogen and a $C_{1-2}$ alkyl group; and wherein each $R^5$ is a hydrogen;

wherein the deposition aid polymer has a weight average molecular weight of <100,000 Daltons; and with the proviso that the deposition aid polymer has an average of 3 to 20 structural units of formula (II) per molecule.

2. The fabric care composition of claim 1, wherein the fabric care composition comprises 2.5 to 6 wt %, based on weight of the fabric care composition, of the fabric care benefit agent; wherein the fabric care benefit agent is a fabric softening silicone selected from the group consisting of a nitrogen free silicone polymer, an anionic silicone polymer and mixtures thereof; and 2 to 3 wt % of the deposition aid polymer, comprising:

(a) 90 to 95 wt %, based on weight of the deposition aid polymer, of structural units of formula (I); wherein each $R^1$ is a hydrogen; and (b) 5 to 10 wt %, based on weight of the deposition aid polymer, of structural units of formula (II); wherein each $R^4$ is a methyl group; wherein each $R^5$ is a hydrogen; and with the proviso that the deposition aid polymer has an average of 3.5 to 15 structural units of formula (II) per molecule.

3. The fabric care composition of claim 2, further comprising: a builder and a cleaning surfactant.

4. The fabric care composition of claim 3, further comprising: a liquid carrier.

5. The fabric care composition of claim 4, wherein the fabric care benefit agent is a fabric softening silicone selected from the group consisting of nitrogen free silicone polymers and anionic silicone polymers.

6. The fabric care composition of claim 5, wherein the fabric care composition is a laundry detergent.

7. The laundry detergent of claim 6, wherein the cleaning surfactant is selected from the group consisting of anionic surfactants, nonionic surfactants, cationic surfactants, amphoteric surfactants and mixtures thereof.

8. The laundry detergent of claim 7, wherein the cleaning surfactant includes a mixture of a linear alkyl benzene sulfonate, a sodium lauryl ethoxysulfate and a nonionic alcohol ethoxylate.

9. A method of treating an article of laundry, comprising: providing an article of laundry; providing a fabric care composition according to claim 1; providing a bath water; and applying the bath water and the fabric care composition to the article of laundry to provide a treated article of laundry; wherein the fabric care benefit agent is associated with the treated article of laundry.

10. The method of claim 9, wherein the fabric care composition is according to claim 8.

11. The fabric care composition of claim 1, wherein the deposition aid polymer has a weight average molecular weight of 5,000 to 30,000 Daltons.

12. The fabric care composition of claim 11, wherein the fabric care composition comprises 2.5 to 6 wt %, based on weight of the fabric care composition, of the fabric care benefit agent; wherein the fabric care benefit agent is a fabric softening silicone selected from the group consisting of a nitrogen free silicone polymer, an anionic silicone polymer and mixtures thereof; and 2 to 3 wt % of the deposition aid polymer, comprising:

(a) 90 to 95 wt %, based on weight of the deposition aid polymer, of structural units of formula (I); wherein each $R^1$ is a hydrogen; and (b) 5 to 10 wt %, based on weight of the deposition aid polymer, of structural units of formula (II); wherein each $R^4$ is a methyl group; wherein each $R^5$ is a hydrogen; and with the proviso that the deposition aid polymer has an average of 3.5 to 15 structural units of formula (II) per molecule.

13. The fabric care composition of claim 12, further comprising: a builder and a cleaning surfactant.

14. The fabric care composition of claim 13, further comprising: a liquid carrier.

15. The fabric care composition of claim 14, wherein the fabric care benefit agent is a fabric softening silicone selected from the group consisting of nitrogen free silicone polymers and anionic silicone polymers.

16. The fabric care composition of claim 15, wherein the fabric care composition is a laundry detergent.

17. The laundry detergent of claim 16, wherein the cleaning surfactant is selected from the group consisting of anionic surfactants, nonionic surfactants, cationic surfactants, amphoteric surfactants and mixtures thereof.

18. The laundry detergent of claim 17, wherein the cleaning surfactant includes a mixture of a linear alkyl benzene sulfonate, a sodium lauryl ethoxysulfate and a nonionic alcohol ethoxylate.

19. A method of treating an article of laundry, comprising: providing an article of laundry; providing a fabric care composition according to claim 11; providing a bath water; and applying the bath water and the fabric care composition to the article of laundry to provide a treated article of laundry; wherein the fabric care benefit agent is associated with the treated article of laundry.

20. The method of claim 19, wherein the fabric care composition is according to claim 18.

* * * * *